United States Patent
Moon et al.

(10) Patent No.: US 10,600,571 B1
(45) Date of Patent: Mar. 24, 2020

(54) MULTILAYER CERAMIC ELECTRONIC COMPONENT

(71) Applicant: Samsung Electro-Mechanics Co., Ltd., Suwon-si, Gyeonggi-do (KR)

(72) Inventors: Ji Hee Moon, Suwon-si (KR); Chae Min Park, Suwon-si (KR); Ji Hea Kim, Suwon-si (KR); Ki Won Kim, Suwon-si (KR); Han Eol Cho, Suwon-si (KR); Yu Bi Han, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/257,623

(22) Filed: Jan. 25, 2019

(30) Foreign Application Priority Data

Nov. 13, 2018 (KR) .......................... 10-2018-0139144

(51) Int. Cl.
*H01G 4/12* (2006.01)
*H01G 2/02* (2006.01)
*H01G 4/30* (2006.01)
*H01G 4/008* (2006.01)

(52) U.S. Cl.
CPC ................ *H01G 4/12* (2013.01); *H01G 2/02* (2013.01); *H01G 4/008* (2013.01); *H01G 4/30* (2013.01)

(58) Field of Classification Search
CPC ............ H01G 4/12; H01G 4/008; H01G 2/02; H01G 4/30
See application file for complete search history.

(56) References Cited

U.S. PATENT DOCUMENTS

| 5,985,414 | A * | 11/1999 | Fukuda | ............... H01F 17/0013 333/185 |
| 8,570,711 | B2 * | 10/2013 | Seo | .......................... H01G 4/30 361/303 |
| 10,068,709 | B2 * | 9/2018 | Miyazaki | ............... H01G 4/248 |
| 2006/0126264 | A1 * | 6/2006 | Yoshii | ..................... H01G 4/232 361/301.1 |
| 2015/0053472 | A1 | 2/2015 | Lee et al. | |
| 2015/0077898 | A1 * | 3/2015 | Chung | ..................... H01G 4/30 361/301.4 |
| 2016/0093437 | A1 * | 3/2016 | Itamura | .................... H01G 4/12 361/301.4 |

(Continued)

FOREIGN PATENT DOCUMENTS

| JP | 2017-028229 A | 2/2017 |
| KR | 10-1452128 B1 | 10/2014 |
| WO | 2016/084457 A1 | 6/2016 |

*Primary Examiner* — Nathan Milakovich
(74) *Attorney, Agent, or Firm* — Morgan, Lewis & Bockius LLP (57) ABSTRACT

A multilayer ceramic electronic component includes a ceramic body including dielectric layers and first and second internal electrodes alternately laminated with the respective dielectric layers disposed therebetween, and first and second external electrodes disposed on first and second external surfaces of the ceramic body to be connected to corresponding internal electrodes, respectively. A longest distance from the first external electrode to the second external electrode is denoted by La, a shortest distance from the first external electrode to the second external electrode is denoted by Lb, and Lb/La is greater than zero to 0.6 or less.

13 Claims, 5 Drawing Sheets

(56) References Cited

U.S. PATENT DOCUMENTS

2016/0099106 A1* 4/2016 Kurokawa ........... H01G 4/0085
                                                       361/301.4
2017/0186538 A1* 6/2017 Ando .................. H01G 4/2325

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0139144 filed on Nov. 13, 2018 in the Korean Intellectual Property Office, the disclosure of which is incorporated herein by reference in its entirety.

TECHNICAL FIELD

The present disclosure relates to a multilayer ceramic electronic component.

BACKGROUND

Multilayer ceramic electronic components are widely used as IT components in computers, PDAs, mobile phones, and the like due to advantages thereof such as compactness, guaranteed high capacitance, and ease of mountability. Also, such multilayer ceramic electronic components are widely used as electric components due to high reliability and high strength characteristics thereof.

Recently, multilayer ceramic electronic components have become smaller due to the miniaturization/thinning of IT products. Accordingly, strengths (for example, flexural strength, tensile strength, fixing strength, and the like) of multilayer ceramic electronic components have become increasingly important.

SUMMARY

An aspect of the present disclosure is to provide a multilayer ceramic electronic component having improved strength.

According to an aspect of the present disclosure, a multilayer ceramic electronic component includes a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and first and second external electrodes disposed on the first and second external surfaces of the ceramic body to be electrically connected to the first and second internal electrodes, respectively, the first and second external electrodes extending along a surface of the ceramic body in the length direction. A longest distance from the first external electrode to the second external electrode in the length direction is denoted by "La", a shortest distance from the first external electrode to the second external electrode in the length direction is denoted by "Lb", and Lb/La is greater than zero and less than or equal to 0.6. An average length of an extending portion of each of the first and second external electrodes in the length direction, corresponding to an edge of the ceramic body, is denoted by "BWc", an average length of an extending portion of each of the first and second external electrodes in the length direction, corresponding to a center of the surface of the ceramic body that the first or second external electrode extends along, is denoted by "BWd", and BWd is greater than BWc.

According to another aspect of the present disclosure, a multilayer ceramic electronic component includes a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and first and second external electrodes disposed on the first and second external surfaces of the ceramic body to be electrically connected to the first and second internal electrodes, respectively, the first and second external electrodes extending along a surface of the ceramic body in the length direction. A longest distance from the first external electrode to the second external electrode in the length direction is denoted by "La", a shortest distance from the first external electrode to the second external electrode in the length direction is denoted by "Lb", and Lb/La is greater than zero and less than or equal to 0.6. An average length of an extending portion of each of the first and second external electrodes in the length direction, corresponding to an edge of the ceramic body, is denoted by "BWc", an average length of an extending portion of each of the first and second external electrodes in the length direction, corresponding to a center of the surface of the ceramic body that the first or second external electrode extends along, is denoted by "BWd", and BWc/BWd is 0.7 or more and less than 1.

According to still another aspect of the present disclosure, a multilayer ceramic electronic component includes a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and first and second external electrodes disposed on the first and second external surfaces of the ceramic body to be electrically connected to the first and second internal electrodes, respectively, the first and second external electrodes extending along a surface of the ceramic body in the length direction. A longest distance from the first external electrode to the second external electrode in the length direction is denoted by "La", a shortest distance from the first external electrode to the second external electrode in the length direction is denoted by "Lb", and Lb/La is greater than zero and less than or equal to 0.6. An average length of an extending portion of each of the first and second external electrodes in the length direction, corresponding to an edge of the ceramic body, is denoted by "BWc", an average length of an extending portion of each of the first and second external electrodes in the length direction, corresponding to a center of the surface of the ceramic body that the first or second external electrode extends along, is denoted by "BWd", and BWd is greater than BWc. The ceramic body and the first and second external electrodes are mounted on first and second electrode pads that are disposed on a board.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Through the specification, in addition, unless explicitly described to the contrary, the word "comprise" and variations such as "comprises" or "comprising," will be understood to imply the inclusion of stated elements but not the exclusion of any other elements.

Directions of a hexahedral ceramic body will be defined in order to clearly describe an embodiment of the invention. L, W and T shown throughout the drawings refer to a length direction, a width direction, and a thickness direction, respectively. Here, the thickness direction may be the same as a direction in which dielectric layers are laminated.

Hereinafter, a multilayer ceramic electronic component according to an exemplary embodiment in the present disclosure will be described. In detail, a multilayer ceramic capacitor will be described. However, the present disclosure is not limited thereto.

Figure 1:
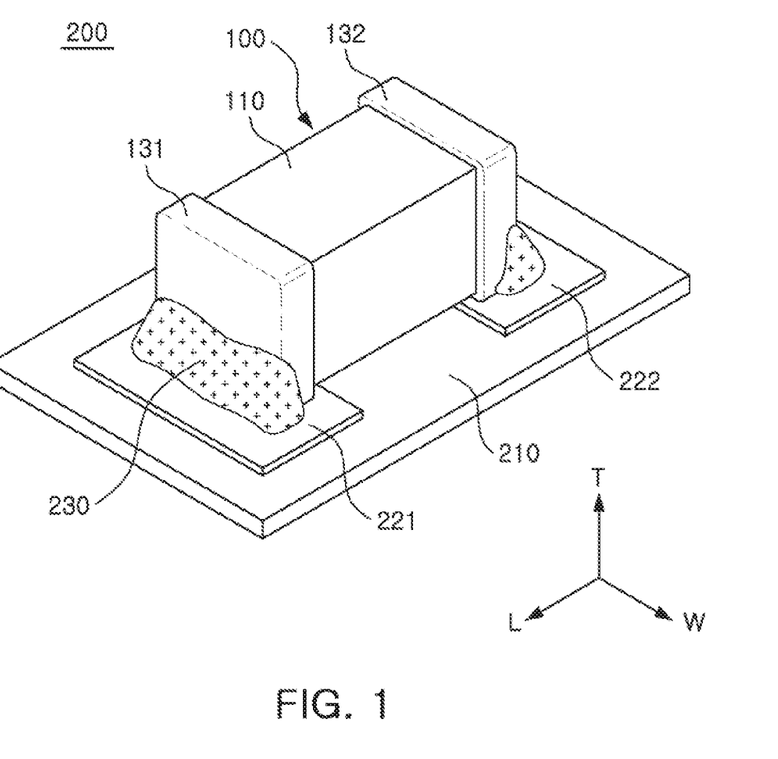
FIG. 1 is a perspective view illustrating a multilayer ceramic electronic component and a mounting form thereof according to an exemplary embodiment in the present disclosure.

FIG. 1 is a perspective view illustrating a multilayer ceramic electronic component and a mounting from thereof according to an exemplary embodiment in the present disclosure.

Referring to FIG. 1, a multilayer ceramic electronic component 100 may include a ceramic body 110 and first and second external electrodes 131 and 132, and may be mounted (200) on first and second electrode pads 221 and 222 on a board 210.

The ceramic body 110 maybe formed as a hexahedron having two side surfaces in a length direction L, two side surfaces in a width direction W, and two side surfaces in a thickness direction T. The ceramic body 110 may be formed by laminating a plurality of dielectric layers 111 in the thickness direction T and then sintering the plurality of dielectric layers 111. Shapes and dimensions of the ceramic body 110 and the number of laminated dielectric layers 111 (one or more) are not limited to those of an example illustrated in the exemplary embodiment.

The plurality of dielectric layers 111 disposed in the ceramic body 110 may be in a sintered state, and adjacent dielectric layers 111 may be integrated with each other so that boundaries therebetween are not readily apparent without using a scanning electron microscope (SEM).

A thickness of the dielectric layer 111 may be arbitrarily changed in accordance with a capacitance design of the multilayer ceramic electronic component 100, and the dielectric layer 111 may contain ceramic powder particles having a high dielectric constant, such as barium titanate ($BaTiO_3$)-based powder particles or strontium titanate ($SrTiO_3$)-based powder particles. However, a material thereof is not limited thereto. Further, various ceramic additives, organic solvents, plasticizers, binders, dispersing agents, and the like, may be added to the ceramic powder particles, according to the object of the present disclosure.

An average particle size of a ceramic powder used to form the dielectric layer 111 is not limited and may be controlled to achieve the object of the present disclosure. For example, the average particle size may be controlled to be 400 nanometers (nm) or less. Accordingly, the multilayer ceramic electronic component 100 according to an exemplary embodiment may be used as a component requiring a large size and high capacitance as in the case of IT components.

For example, the dielectric layer 111 may be formed by applying slurry containing a powder such as a barium titanate ($BaTiO_3$)-based powder to carrier films and drying the applied slurry to prepare a plurality of ceramic sheets. The ceramic sheet may be manufactured by mixing the ceramic powder, a binder, and a solvent to prepare the slurry and manufacturing the prepared slurry in a sheet shape having a thickness of several micrometers (μm) by a doctor blade method, but the manufacturing method of the ceramic sheet is not limited thereto.

The first and second external electrodes 131 and 132 may be disposed on first and second external surfaces (for example, one external surface and the other external surfaces in the length direction) of the ceramic body 110 to be connected to first and second internal electrodes, respectively. Also the first and second external electrodes 131 and 132 may be configured to electrically connect the first and second internal electrodes to a board.

For example, the first and second external electrodes 131 and 132 maybe formed of one of copper (Cu), palladium (Pd), platinum (Pt), gold (Au), silver (Ag), and lead (Pb), or alloys thereof.

The first and second external electrodes 131 and 132 maybe electrically connected to the first and second electrode pads 221 and 222 through first and second solders 230, respectively. For example, the first and second solders 230 may be more closely connected to the first and second external electrodes 131 and 132 according to a reflow process.

Figure 2:
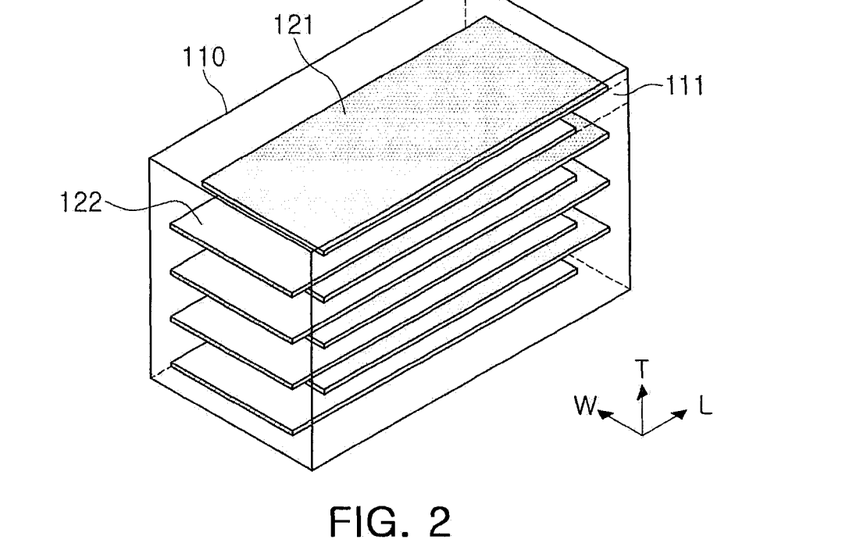
FIG. 2 is a perspective view illustrating a shape of an internal electrode of a multilayer ceramic electronic component according to an exemplary embodiment in the present disclosure.

FIG. 2 is a perspective view illustrating a shape of an internal electrode of a multilayer ceramic electronic component according to an exemplary embodiment in the present disclosure.

Referring to FIG. 2, a ceramic body 110 includes first and second internal electrodes 121 and 122, and a plurality of dielectric layers 111. The first and second internal electrodes 121 and 122 are alternately laminated with respective dielectric layers 111 disposed therebetween to be exposed to a first external surface and a second external surface of the ceramic body 110 (for example, one external surface and the other external surface of the ceramic body 110 in the length direction) to have polarities opposite to each other.

The first internal electrodes 121 and the second internal electrodes 122 maybe formed in a laminating direction of the dielectric layers 111 to be alternately exposed to one external surface and the other external surface of the ceramic body 110 in the length direction L of the ceramic body 110 by printing a conductive paste containing a conductive metal thereon. The first internal electrodes 121 and the second internal electrodes 122 maybe electrically insulated from each other by respective dielectric layers 111 disposed therebetween.

For example, the first and second internal electrodes 121 and 122 maybe electrically connected to the first and second external electrodes 131 and 132 disposed on both external surfaces of the ceramic body 110 in the length direction L of the ceramic body 110 through portions alternately exposed to both external surfaces of the ceramic body 110 in the length direction L of the ceramic body 110, respectively.

For example, the first and second internal electrodes 121 and 122 by formed by a conductive paste for an internal electrode having an average particle size of 0.1 to 0.2 μm and containing 40 wt % to 50 wt % of conductive metal powder particles, but the conductive paste thereof is not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode pattern is printed may be laminated, pressed, and sintered to manufacture the ceramic body 110.

Accordingly, when a voltage is applied to the first and second eternal electrodes 131 and 132 opposing each other, charges are accumulated between the first and second internal electrodes 121 and 122. In this case, capacitance of the multilayer ceramic electronic component 100 is in proportion to an area of a region in which the first and second internal electrodes 121 and 122 overlap each other.

For example, when the overlapping area of the first and second internal electrodes 121 and 122 is significantly increased, capacitance of even a capacitor having the same size may be significantly increased.

Thicknesses of the first and second internal electrodes 121 and 122 may be determined depending on intended usage thereof. For example, each of the thicknesses of the first and second internal electrodes 121 and 122 may be 0.4 μm or less. In addition, the number of the first and second internal electrodes 121 and 122 laminated may be 400 or more. Thus, the multilayer ceramic electronic component 100 may be used as an IT component requiring compactness and high capacitance.

Since a thickness of a dielectric layer 111 corresponds to a distance between the first and second internal electrodes 121 and 122, the capacitance of the multilayer ceramic electronic component 100 may be increased as the thickness of the dielectric layer 111 is decreased.

The first and second internal electrodes 121 and 122 maybe formed of one of nickel (Ni), copper (Cu), palladium (Pd), silver (Ag), lead (Pb), and platinum (Pt), or alloys thereof, but a material thereof is not limited thereto.

Withstand voltage characteristics of the ceramic body 110 maybe improved as the distance between the first and second internal electrodes 121 and 122 is increased.

In the case in which the multilayer ceramic electronic component 100 is required to have withstand voltage characteristics that are as high as those of an electric component, the multilayer ceramic electronic component 100 may be designed in such a manner that an average thickness of dielectric layers 111 may exceed twice an average thickness of the first and second internal electrodes 121 and 122. Accordingly, the multilayer ceramic electronic component 100 may have high withstand voltage characteristics to be used as an electric component.

Durability (for example, flexural strength) of the ceramic body 110 may have improved reliability when a width of the ceramic body exceeds 0.5 times a thickness thereof.

Figure 3:
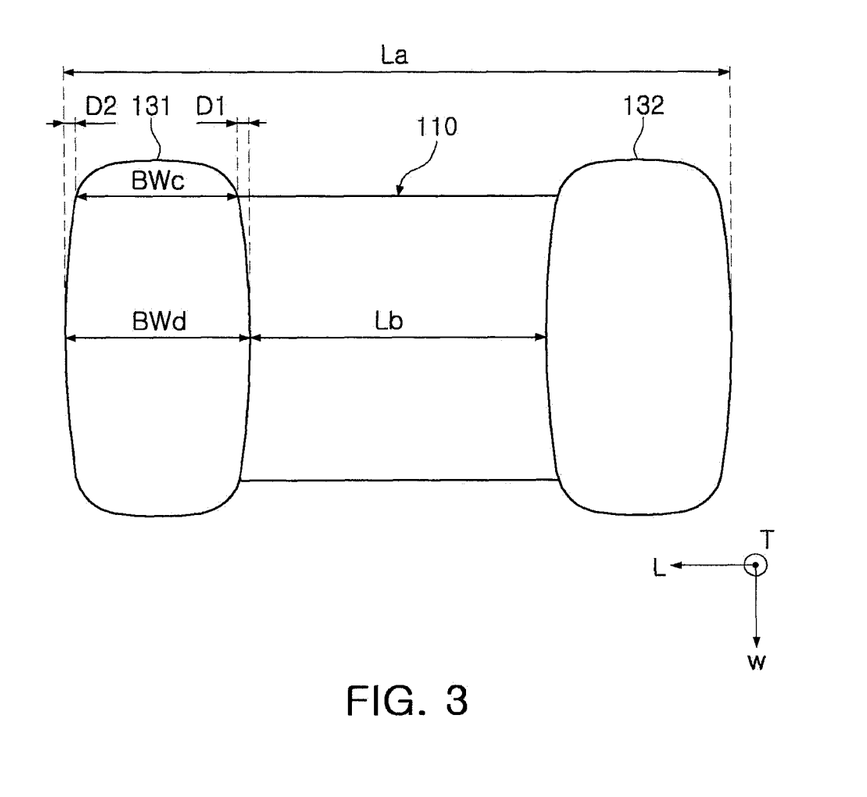
FIG. 3 is a plan view of a length-direction extension of an external electrode of a multilayer ceramic electronic component according to an exemplary embodiment in the present disclosure.
Figure 4:
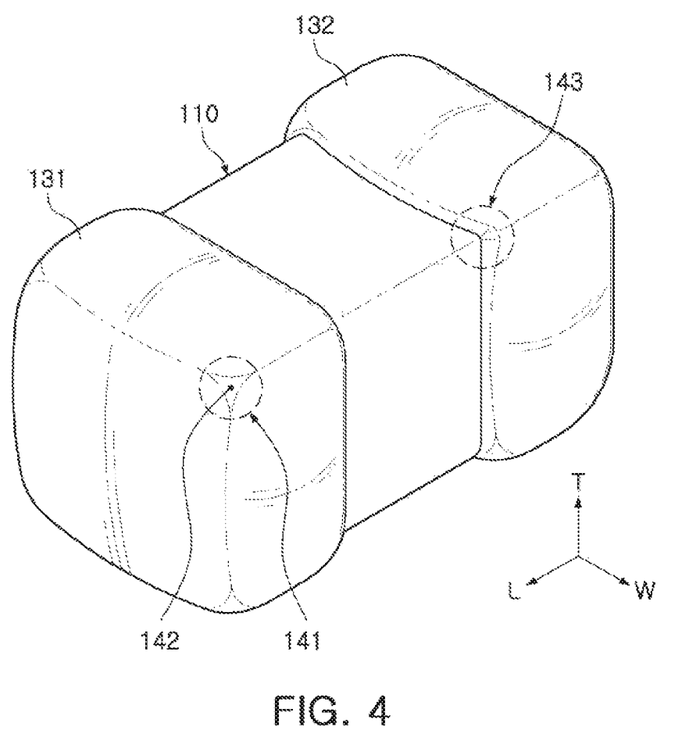
FIG. 4 is a perspective view illustrating a shape of an external electrode of a multilayer ceramic electronic component according to an exemplary embodiment in the present disclosure.

FIG. 3 is a plan view of a length-direction extension of an external electrode of a multilayer ceramic electronic component according to an exemplary embodiment in the present disclosure, and FIG. 4 is a perspective view illustrating a shape of an external electrode of a multilayer ceramic electronic component according to an exemplary embodiment in the present disclosure.

Referring to FIGS. 3 and 4, first and second external electrodes 131 and 132 extend along a surface of a ceramic body 110 in a length direction.

Accordingly, a ratio of the volume of a conductive metal to the total volume of a multilayer ceramic electronic component according to an exemplary embodiment may be increased. Since a conductive metal of the first and second external electrodes 131 and 132 has strength greater than strength of a typical ceramic component, the multilayer ceramic electronic component according to an exemplary embodiment may have greater strength depending on an extension of the first and second external electrodes 131 and 132 in the length direction.

An external impact (for example, bending, tension, or the like) may be further concentrated on a top surface and/or a bottom surface of the multilayer ceramic electronic component. Since rigidity may be further concentrated on the top surface and/or the bottom surface according to the extension of the first and second external electrodes 131 and 132 in the length direction, the multilayer ceramic electronic component may efficiently cope with the external impact and may have further improved strength.

A longest distance from the first external electrode 131 to the second external electrode 132 in the length direction is denoted by La, a shortest distance from the first external electrode 131 to the second external electrode 132 in the length direction is denoted by Lb, and an average of the respective longest distances of the first and second external electrodes 131 and 132 is denoted by BWd.

Table (1) shows flexural strength depending on La, Lb, and BWd. The flexural strength refers to a frequency of cracking occurring when a force is applied to centers of top surfaces and/or bottom surfaces of a plurality of multilayer ceramic electronic components in a thickness direction. In Table (1), a predetermined length is 6 millimeters (mm), and refers to displacement of the center of the top surface and/or the bottom surface of the multilayer ceramic electronic component in the thickness direction.

TABLE 1

| Sample Order | La (mm) | Lb (mm) | BWd (mm) | Lb/La | Flexural Strength | Determination |
|---|---|---|---|---|---|---|
| 1 | 3.2 | 2.8 | 0.20 | 0.88 | 10/20 | NG |
| 2 | 3.2 | 2.7 | 0.25 | 0.84 | 9/20 | NG |
| 3 | 3.2 | 2.6 | 0.30 | 0.81 | 7/20 | NG |
| 4 | 3.2 | 2.5 | 0.35 | 0.78 | 6/20 | NG |
| 5 | 3.2 | 2.4 | 0.40 | 0.75 | 4/20 | NG |
| 6 | 3.2 | 2.3 | 0.45 | 0.72 | 3/20 | NG |
| 7 | 3.2 | 2.2 | 0.50 | 0.69 | 2/20 | NG |
| 8 | 3.2 | 2.1 | 0.55 | 0.66 | 1/20 | NG |
| 9 | 3.2 | 2.0 | 0.60 | 0.63 | 1/20 | NG |

TABLE 1-continued

| Sample Order | La (mm) | Lb (mm) | BWd (mm) | Lb/La | Flexural Strength | Determination |
|---|---|---|---|---|---|---|
| 10 | 3.2 | 1.9 | 0.65 | 0.59 | 0/20 | OK |
| 11 | 3.2 | 1.8 | 0.70 | 0.56 | 0/20 | OK |
| 12 | 3.2 | 1.7 | 0.75 | 0.53 | 0/20 | OK |
| 13 | 3.2 | 1.6 | 0.80 | 0.50 | 0/20 | OK |

Referring to Table (1), when Lb/La was 0.6 or less, cracking did not occur in 20 flexural strength measurements. Accordingly, the multilayer ceramic electronic component may include the first and second external electrodes 131 and 132, in which Lb/La is 0.6 or less, to significantly improve the flexural strength.

In addition, an external impact (for example, bending, tension, or the like) may be further concentrated on a plane of a surface of a multilayer ceramic electronic component than on an edge of the surface thereof.

The multilayer ceramic electronic component according to an exemplary embodiment includes the first and second external electrodes 131 and 132 each further extending at a point corresponding to a plane of the ceramic body 110 rather than from a point corresponding to an edge along the surface of the ceramic body 110 in the length direction. Thus, the multilayer ceramic electronic component may further concentrate rigidity on the plane of the surface than the edge of the surface and may have further improved strength.

The phrase "further extending at a point corresponding to a plane rather than from a point corresponding to an edge" means that an average D1 of internal different lengths of BWc and BWd of each of the first and second external electrodes 131 and 132 in the length direction is greater than zero (0). An average D2 of external different lengths of BWc and BWd of each of the first and second external electrodes 131 and 132 in the length direction may be greater than zero (0), but is not limited thereto. BWc refers to an average of respective lengths of the first and second external electrodes 131 and 132 based on aside of the ceramic body 110 in a length direction, and BWd refers to an average of respective longest distances of the first and second external electrode 131 and 132 in the length direction.

For example, when Lb/La of the first and second external electrodes 131 and 132 is 0.5 or more, a short-circuit between the first and second external electrodes 131 and 132 may be prevented by high reliability in spite of a length-direction extension deviation of each of the first and second external electrodes 131 and 132.

The multilayer ceramic electronic component according to an exemplary embodiment may more efficiently cope with an external impact and may have strength further improved by balancing rigidity of a portion corresponding to an edge of the surface of the ceramic body 110 with rigidity of a point corresponding to a plane thereof.

Table (2) shows flexural strength depending La, BWc, and BWd. Flexural strength test conditions and determination conditions in Table (2) are the same as those in Table (1).

TABLE 2

| Sample Order | La (mm) | BWc (mm) | BWd (mm) | BWc/BWd | Flexural Strength | Determination |
|---|---|---|---|---|---|---|
| 1 | 3.2 | 0.20 | 0.5 | 0.4 | 4/20 | NG |
| 2 | 3.2 | 0.25 | 0.5 | 0.5 | 2/20 | NG |
| 3 | 3.2 | 0.30 | 0.5 | 0.6 | 1/20 | NG |
| 4 | 3.2 | 0.35 | 0.5 | 0.7 | 0/20 | OK |
| 5 | 3.2 | 0.40 | 0.5 | 0.8 | 0/20 | OK |
| 6 | 3.2 | 0.45 | 0.5 | 0.9 | 0/20 | OK |
| 7 | 3.2 | 0.50 | 0.5 | 1.0 | 0/20 | OK |

Referring to Table (2), when BWc/BWd was 0.7 or more, cracking did not occur in 20 flexural strength measurements. Accordingly, the multilayer ceramic electronic component may include the first and second external electrodes 131 and 132, in which Lb/La is 0.7 or less, to significantly improve the flexural strength.

For example, the first and second external electrodes 131 and 132 may have an external side corner 141 and an internal side corner 143. A radius RC of the external side corner 141 maybe appropriately designed to avoid exposition of the ceramic body 110 at a vertex 142. For example, the radius RC of the external side corner 141 may be adjusted by controlling polishing time during a polishing process of the ceramic body 110.

Figure 5A:
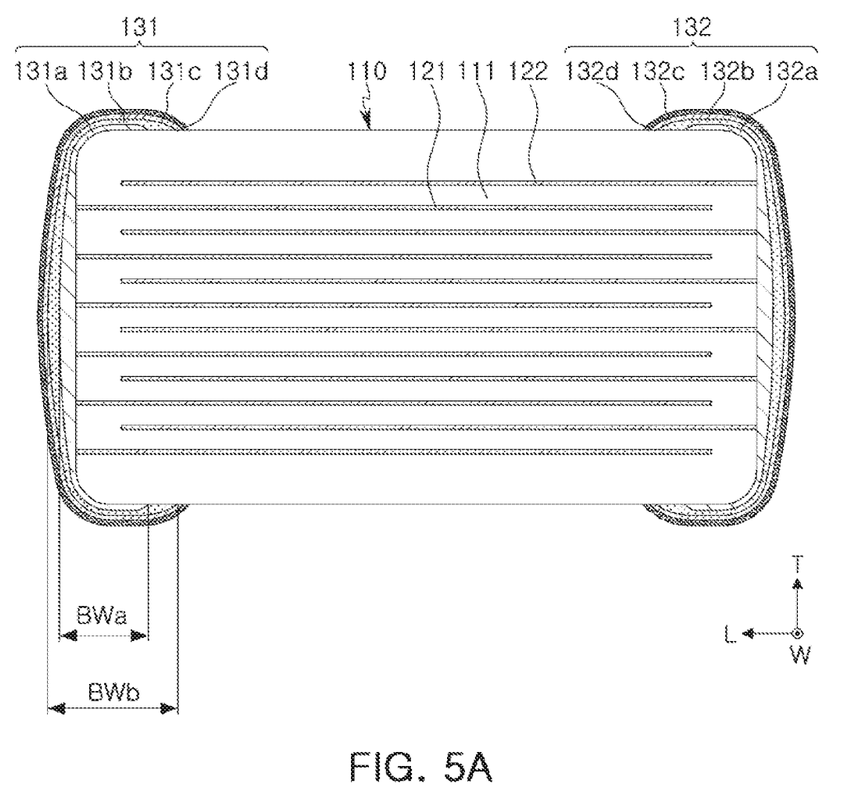
FIG. 5A is a cross-sectional view illustrating a side surface of a multilayer ceramic electronic component according to an exemplary embodiment in the present disclosure.

FIG. 5A is a cross-sectional view illustrating a side surface of a multilayer ceramic electronic component according to an exemplary embodiment in the present disclosure.

Referring to FIG. 5A, first and second external electrodes 131 and 132 may include first and second base electrode layers 131a and 132a, each having at least a portion in contact with first and second external surfaces (for example, one external surface and the other external surface of the ceramic body 110 in a length direction), first and second conductive resin layers 131b and 132b disposed to cover the first and second base electrode layers 131a and 132a, and first and second plating layers 131c and 132c disposed to cover the first and second conductive resin layers 131b and 132b, respectively.

For example, the first and second base electrode layers 131a and 132a may contain the most the same metal component as a metal component (for example, copper (Cu), nickel (Ni), or the like) contained most in the internal electrodes 121 and 122 and may be formed using sintering. Accordingly, since the first and second base electrode layers 131a and 132a may be relatively easily bonded to the first and second internal electrodes 121 and 122, currents of the first and second internal electrodes 121 and 122 may be collected efficiently (for example, low contact resistance).

The first and second base electrode layers 131a and 132a may be formed by dipping into a paste containing a metal component or printing a conductive paste containing a conductive metal on at least one surface of the ceramic body 110 in a thickness direction T. Alternatively, the first and second base electrode layers 131a and 132a may be formed by a sheet transfer method or a pad transfer method, but a forming method thereof is not limited thereto.

Since the first and second conductive resin layers 131b and 132b may have higher flexibility than the first and second plating layers 131c and 132c, they may protect the multilayer ceramic electronic component 100 from an external physical impact or a bending impact of the multilayer ceramic electronic component 100. In addition, the first and second conductive resin layers 131b and 132b may absorb tensile stress or stress applied during board mounting to prevent cracking from occurring in an external electrode.

For example, the first and second conductive resin layers 131b and 132b may have a structure, in which a conductive particle such as copper (Cu), nickel (Ni), palladium (Pd), platinum (Pt), gold (Au), silver (Ag), lead (Pb), or the like is contained in a glass or a highly-flexible resin such as epoxy, to have high flexibility and high conductivity.

The first and second plating layers 131c and 132c may improve at least some of structural reliability, ease of board mounting, resistance to the outside, heat resistance, and equivalent series resistance (ESR), and may be formed using sputtering or electric deposition, but a forming method thereof is not limited thereto.

The first and second external electrodes 131 and 132 may include third and fourth plating layers 131d and 132d disposed to cover the first and second plating layers 131c and 132c, respectively. The third and fourth plating layers 131d and 132d may contain the most tin (Sn), and the first and second plating layers 131c and 132c may contain the most nickel (Ni). In the case in which the third and fourth plating layers 131d and 132d are included in the first and second external electrodes 131 and 132, the first and second plating layers 131c and 132c may be omitted depending on a design.

An average of respective longest distances of the first and second conductive resin layers 131b and 132b in a length direction is denoted by BWb, and BWb may be greater than BWc. Accordingly, since the first and second external electrodes 131 and 132 may extend impact absorption performance of the first and second conductive resin layers 131b and 132b in the length direction, the first and second external electrodes 131 and 132 may further uniformly protect the ceramic body 110 from an external impact.

An average of respective longest distances of the first and second base electrode layers 131a and 132a in a length direction is denoted by BWa, and BWa may be smaller than BWc. Accordingly, the first and second external electrodes 131 and 132 may efficiently suppress cracking starting from edges of the first and second base electrode layers 131a and 132a in the length direction.

Figure 5B:
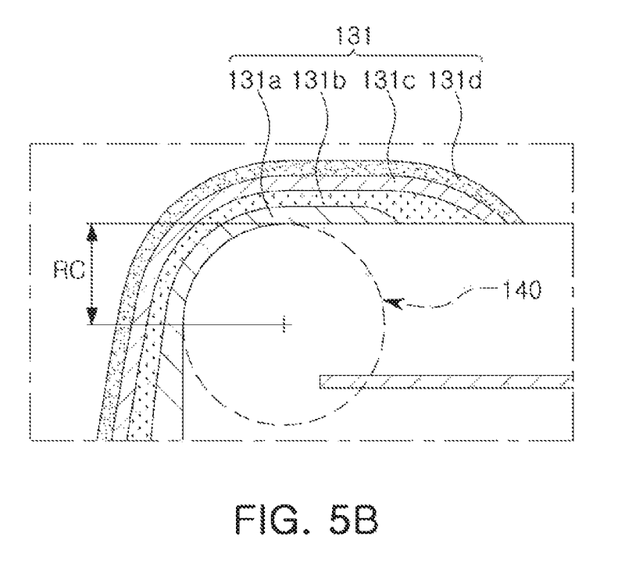
FIG. 5B is a cross-sectional view illustrating a corner of a multilayer ceramic electronic component according to an exemplary embodiment in the present disclosure.

FIG. 5B is a cross-sectional view illustrating a corner of a multilayer ceramic electronic component according to an exemplary embodiment in the present disclosure.

Referring to FIG. 5B, a ceramic body 110 may have a hexahedral shape having at least one rounded corner 140. Accordingly, durability and reliability of the ceramic body 110 maybe improved, and structural reliability of first and second external electrodes 131 and 132 at a corner may be improved.

An average of internal different lengths of BWc and BWd of each of the first and second external electrodes 131 and 132 in the length direction is denoted as D1, an average of external different lengths of BWc and BWd of each of the first and second external electrodes 131 and 132 in the length direction is denoted as D2, and D1 may be greater than D2.

The average D2 may be increased as a radius RC of the rounded corner 140 be increased. Edge rigidity of a multilayer ceramic electronic component maybe improved as a radius of the rounded corner 140 of the ceramic body 110 may be increased.

Due to the first and second external electrodes 131 and 132 having D1 greater than D2, the multilayer ceramic electronic component may further balance rigidity of a portion corresponding to an edge of a surface of the ceramic body 110 with rigidity of a point corresponding to a plane thereof, further efficiently cope with an external impact, and have further improved strength.

Moreover, RC may be greater than D1 to achieve uniform extension of each of the first and second external electrodes 131 and 132 in a length direction. The multilayer ceramic electronic component may further balance rigidity of a portion corresponding to an edge of a surface of the ceramic body 110 with rigidity of a point corresponding to a plane thereof, further efficiently cope with an external impact, and have further improved strength.

As described above, a multilayer ceramic electronic component according to an exemplary embodiment may have improved strength.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and
first and second external electrodes disposed on the first and second external surfaces of the ceramic body to be electrically connected to the first and second internal electrodes, respectively, the first and second external electrodes extending along a surface of the ceramic body in the length direction,
wherein Lb/La is greater than zero and less than or equal to 0.6, where a longest distance from the first external electrode to the second external electrode in the length direction is denoted by "La", and a shortest distance from the first external electrode to the second external electrode in the length direction is denoted by "Lb",
wherein BWd is greater than BWc, where an average length of an extending portion of each of the first and second external electrodes in the length direction, corresponding to an edge of the ceramic body, is denoted by "BWc", and an average length of an extending portion of each of the first and second external electrodes in the length direction, corresponding to a center of the surface of the ceramic body is denoted by "BWd",
wherein the ceramic body has a hexahedral shape having at least one rounded corner, and
wherein $0<D2<D1<RC$, where an average difference between BWc and BWd in the length direction, corresponding to an inner end portion of each of the first and second external electrodes in the length direction, is denoted by "D1", an average difference between BWc and BWd in the length direction, corresponding to an outer end portion of each of the first and second external electrodes in the length direction, is denoted by "D2", and a radius of the at least one rounded corner is denoted by "RC".

2. The multilayer ceramic electronic component of claim 1, wherein BWc/BWd is 0.7 or more and less than 1.

3. The multilayer ceramic electronic component of claim 1, wherein Lb/La is 0.5 or more and 0.6 or less.

4. The multilayer ceramic electronic component of claim 1, wherein the first and second external electrodes respectively include first and second base electrode layers, each of the first and second base electrode layers having at least a portion in contact with the first and second external surfaces of the ceramic body, respectively, first and second conductive resin layers disposed to cover the first and second base electrode layers, respectively, and first and second plating layers disposed to cover the first and second conductive resin layers, respectively, and BWb is greater than BWc, where an average of respective longest distances of the first and second conductive resin layers in the length direction is denoted by "BWb".

5. The multilayer ceramic electronic component of claim 4, wherein BWa is less than BWc, where an average of respective longest distances of the first and second base electrode layers in the length direction is denoted by "BWa".

6. The multilayer ceramic electronic component of claim 1, wherein a distance between adjacent layers of the first and second internal electrodes is equal to or more than twice an average of respective thicknesses of the first and second internal electrodes.

7. A multilayer ceramic electronic component comprising:
a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and first and second external electrodes disposed on the first and second external surfaces of the ceramic body to be electrically connected to the first and second internal electrodes, respectively, the first and second external electrodes extending along a surface of the ceramic body in the length direction, wherein Lb/La is greater than zero and less than or equal to 0.6, where a longest distance from the first external electrode to the second external electrode in the length direction is denoted by "La", a shortest distance from the first external electrode to the second external electrode in the length direction is denoted by "Lb", wherein BWc/BWd is 0.7 or more and less than 1, where an average length of an extending portion of each of the first and second external electrodes in the length direction, corresponding to an edge of the ceramic body, is denoted by "BWc", an average length of an extending portion of each of the first and second external electrodes in the length direction, corresponding to a center of the surface of the ceramic body is denoted by "BWd", wherein the ceramic body has a hexahedral shape having at least one rounded corner, and wherein 0<D2<D1<RC, where an average difference between BWc and BWd in the length direction, corresponding to an inner end portion of each of the first and second external electrodes in the length direction, is denoted by "D1", an average difference between BWc and BWd in the length direction, corresponding to an outer end portion of each of the first and second external electrodes in the length direction, is denoted by "D2", and a radius of the at least one rounded corner is denoted by "RC".

8. The multilayer ceramic electronic component of claim 7, wherein Lb/La is 0.5 or more and 0.6 or less.

9. A multilayer ceramic electronic component comprising:
a ceramic body including dielectric layers and first and second internal electrodes alternately laminated with the dielectric layers disposed therebetween in a stacking direction, the first and second internal electrodes being exposed to first and second external surfaces of the ceramic body, respectively, in a length direction; and first and second external electrodes disposed on the first and second external surfaces of the ceramic body to be electrically connected to the first and second internal electrodes, respectively, the first and second external electrodes extending along a surface of the ceramic body in the length direction, wherein Lb/La is greater than zero and less than or equal to 0.6, where a longest distance from the first external electrode to the second external electrode in the length direction is denoted by "La", a shortest distance from the first external electrode to the second external electrode in the length direction is denoted by "Lb", wherein BWd is greater than BWc, where an average length of an extending portion of each of the first and second external electrodes in the length direction, corresponding to an edge of the ceramic body, is denoted by "BWc", an average length of an extending portion of each of the first and second external electrodes in the length direction, corresponding to a center of the surface of the ceramic body, is denoted by "BWd", wherein the ceramic body has a hexahedral shape having at least one rounded corner, wherein 0<D2<D1<RC, where an average difference between BWc and BWd in the length direction, corresponding to an inner end portion of each of the first and second external electrodes in the length direction, is denoted by "D1", an average difference between BWc and BWd in the length direction, corresponding to an outer end portion of each of the first and second external electrodes in the length direction, is denoted by "D2", and a radius of the at least one rounded corner is denoted by "RC", and wherein the ceramic body and the first and second external electrodes are mounted on first and second electrode pads that are disposed on a board.

10. The multilayer ceramic electronic component of claim 9, wherein BWc/BWd is 0.7 or more and less than 1.

11. The multilayer ceramic electronic component of claim 9, wherein Lb/La is 0.5 or more and 0.6 or less.

12. The multilayer ceramic electronic component of claim 9, wherein the first and second external electrodes respectively include first and second base electrode layers, each of the first and second base electrode layers having at least a portion in contact with the first and second external surfaces of the ceramic body, respectively, first and second conductive resin layers disposed to cover the first and second base electrode layers, respectively, and first and second plating layers disposed to cover the first and second conductive resin layers, respectively, and BWb is greater than BWc, where an average of respective longest distances of the first and second conductive resin layers in the length direction is denoted by "BWb".

13. The multilayer ceramic electronic component of claim 12, wherein BWa is less than BWc, where an average of respective longest distances of the first and second base electrode layers in the length direction is denoted by "BWa".

* * * * *